(12) United States Patent
Zeng et al.

(10) Patent No.: US 11,760,638 B2
(45) Date of Patent: Sep. 19, 2023

(54) METHOD FOR PREPARING GRAPHENE MATERIAL FROM INDUSTRIAL HEMP BY LASER INDUCTION

(71) Applicants: Yunnan Huapu quantum Material Co., Ltd, Yunnan (CN); ROI Optoelectronics Technology CO, LTD., Shanghai (CN); Chongqing Institute of East China Normal University, Chongqing (CN); East China Normal University, Shanghai (CN)

(72) Inventors: Heping Zeng, Chongqing (CN); Chuan Yang, Chongqing (CN); Mengyun Hu, Chongqing (CN)

(73) Assignees: YUNNAN HUAPU QUANTUM MATERIAL CO., LTD, Yunnan (CN); ROI OPTOELECTRONICS TECHNOLOGY CO, LTD., Shanghai (CN); CHONGQING INSTITUTE OF EAST CHINA NORMAL UNIVERSITY, Chongqing (CN); EAST CHINA NORMAL UNIVERSITY, Shanghai (CN)

( * ) Notice: Subject to any disclaimer, the term of this patent is extended or adjusted under 35 U.S.C. 154(b) by 0 days.

(21) Appl. No.: 17/702,386

(22) Filed: Mar. 23, 2022

(65) Prior Publication Data
US 2022/0306474 A1 Sep. 29, 2022

(30) Foreign Application Priority Data
Mar. 24, 2021 (CN) .......................... 202110310120.1

(51) Int. Cl.
 *C01B 32/184* (2017.01)
 *B01J 19/12* (2006.01)

(52) U.S. Cl.
 CPC .......... *C01B 32/184* (2017.08); *B01J 19/121* (2013.01); *B01J 19/126* (2013.01)

(58) Field of Classification Search
 CPC ... C01B 32/182; C01B 32/184; C01B 32/186; C01B 32/188; C01B 32/19;
 (Continued)

(56) References Cited

U.S. PATENT DOCUMENTS

2019/0330064 A1* 10/2019 Tour ..................... B01D 71/021
2020/0381732 A1* 12/2020 Wagner .................. C01B 32/20

FOREIGN PATENT DOCUMENTS

CN 110167877 A 8/2019

OTHER PUBLICATIONS

Liu, et al., Effect of harvest time and field retting duration on the chemical composition, morphology and mechanical properties of hemp fibers, Industrial Crops and Products 2015; 69: 29-39 (Year: 2015).*

(Continued)

*Primary Examiner* — Daniel C. McCracken
(74) *Attorney, Agent, or Firm* — Hodgson Russ LLP

(57) ABSTRACT

Provided is a method for preparing a graphene material from an industrial hemp material by laser induction, which uses a skin, a stem and/or a root of industrial hemp as a carbon precursor-containing material and reduce the carbon precursor-containing material into graphene by laser induction, so as to prepare graphene, graphene quantum dots, a graphene mesoporous material and a graphene composite material.

20 Claims, 3 Drawing Sheets

(58) Field of Classification Search
CPC ... C01B 32/192; C01B 32/194; C01B 32/196; C01B 32/198; C01B 2204/00; C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B01J 19/121; B01J 19/126

See application file for complete search history.

(56) References Cited

OTHER PUBLICATIONS

Vukcevic, et al., Production of activated carbon derived from waste hemp (*Cannabis sativa*) fibers and its performance in pesticide adsorption, Microporous and Mesoporous Materials 2015; 214: 156-165 (Year: 2015).*

CNIPA, First Office Action for CN Application No. 202110310120.1, dated Jul. 13, 2022.

* cited by examiner

```
┌─────────────────────────────────────────────────────────────┐
│ air-dried industrial hemp is treated to obtain a skin, a stem and a root │
│ of the industrial hemp, each of which may be used as a carbon │
│                  precursor-containing material              │
└─────────────────────────────────────────────────────────────┘
                              │
                              ▼
┌─────────────────────────────────────────────────────────────┐
│ the skin, the stem or the root of the industrial hemp is subjected to a │
│ flaking process, a pulverizing process or a pulping process as required │
│ to obtain the carbon precursor-containing material in different states │
└─────────────────────────────────────────────────────────────┘
                              │
                              ▼
┌─────────────────────────────────────────────────────────────┐
│ the obtained carbon precursor-containing material is subjected to │
│ vacuum carbonization by heating to perform selective carbonization │
└─────────────────────────────────────────────────────────────┘
                              │
                              ▼
┌─────────────────────────────────────────────────────────────┐
│ the carbonized carbon precursor-containing material is subjected to │
│ laser scanning to convert the carbon precursor-containing material into │
│                      a graphene material                    │
└─────────────────────────────────────────────────────────────┘
                              │
                              ▼
┌─────────────────────────────────────────────────────────────┐
│ graphene, graphene quantum dots, a graphene mesoporous material or │
│   a graphene composite material may be obtained depending on │
│       different states of the carbon precursor-containing material │
└─────────────────────────────────────────────────────────────┘
```

FIG. 1

METHOD FOR PREPARING GRAPHENE MATERIAL FROM INDUSTRIAL HEMP BY LASER INDUCTION

CROSS-REFERENCE TO RELATED APPLICATION

This application claims priority to Chinese Patent Application No. 202110310120.1, filed on Mar. 24, 2021, the entire contents of which is incorporated herein by reference.

FIELD

The present disclosure relates to the processing technical field of a graphene material, and more particularly to a method for preparing a graphene material from industrial hemp by laser induction.

BACKGROUND

Graphene is a two-dimensional carbon nanomaterial in which carbon atoms are tightly packed into orthohexagonal cellular lattices. As an ultra-light material, graphene has superior electrical conductivity, thermal conductivity, mechanical properties and light transmittance, and has a larger specific surface area. Due to the excellent comprehensive properties in optics, electricity and mechanics, graphene has important application prospects and value in the fields of communication electronics, aerospace, new energy, resources and environment. The common methods for preparing graphene include: micromechanical exfoliation, epitaxial growth, chemical vapor deposition (CVD), reduction of graphene oxide, and laser induction. The laser induction method is to ablate a carbon precursor-containing material by a laser to break chemical bonds of the material, and at the same time, the broken chemical bonds are recombined to carbon-carbon single and double bonds to form graphene, and other elements in the material are released as gaseous substances.

As industrial hemp is rich in hemp fiber and cannabidiol (CBD), and the tetrahydrocannabinol (THC) content contained therein is less than 0.3%, it is considered to have no value for drug utilization, but have important commercial value. Industrial hemp has been legally cultivated in many countries around the world. At present, products made from industrial hemp have been widely used in medical, food, textile, construction, automobile, aerospace and other fields with great development prospects. Among others, seeds, flowers and leaves of industrial hemp mainly contain phenolic compounds like CBD and oils, which are commonly used in consumption and medical fields, such as beverages, health products, cosmetics and pharmaceuticals. Skin, stem and root of the industrial hemp mainly contain fibers, which are commonly used in textile or as reinforcement materials for building materials, automobile and aerospace materials. In particular, fibers of the industrial hemp are superior textile raw materials, which have unique and excellent characteristics such as natural bacteriostasis, cool and soft, ultraviolet radiation shielding, anti-static, heat resistance and so on. The skin, stem and root of industrial hemp mainly contain hemp fibers, which can be subdivided into cellulose fibers and non-cellulose fibers. The non-cellulose fibers include hemicellulose, pectin, lignin, water-soluble matter, wax and ash, which are collectively referred to as colloids. These colloids may provide good carbon precursor materials for the preparation of graphene. If the colloids in industrial hemp can be converted into graphene by a corresponding means, the hemp fiber may be coated by graphene, so as to obtain a porous graphene coated fiber material.

SUMMARY

Embodiments of the present disclosure seek to provide a method for preparing a graphene material from industrial hemp material by laser induction. The method uses a skin, a stem and/or a root of industrial hemp (also referred as hemp skin, hemp stem and/or hemp root, respectively) as a carbon precursor-containing material. Through the method according to the present disclosure, the preparation of graphene, graphene quantum dots, graphene mesoporous materials and graphene composite materials can be realized. In particular, as the skin of industrial hemp is rich in fiber tissue and colloid, and the fiber tissue is naturally coated by the colloid, by using the colloid in industrial hemp as the carbon precursor-containing material and reducing the colloid into graphene through laser induction, the fiber tissue may be coated by graphene, so as to obtain a porous graphene coated fiber material. The raw material used in the method of the present disclosure is green and environmentally friendly, and the method is simple, efficient and economic, and suitable for mass production.

In embodiments of the present disclosure, there is provided a method for producing a graphene material from an industrial hemp material by laser induction. The method includes:
  preparing a carbon precursor-containing material from the industrial hemp material;
  subjecting the carbon precursor-containing material to carbonization; and
  subjecting the carbonized carbon precursor-containing material to laser scanning to convert the carbonized carbon precursor-containing material into the graphene material.

In some embodiments, the industrial hemp material is air dried.

In some embodiments, the industrial hemp material may be selected from a skin, a stem and a root of industrial hemp.

In some embodiments, preparing the carbon precursor-containing material from the industrial hemp material includes: subjecting the industrial hemp material to a flaking process to obtain the carbon precursor-containing material in flakes.

In some embodiments, preparing the carbon precursor-containing material from the industrial hemp material includes: subjecting the industrial hemp material to a pulverizing process to obtain the carbon precursor-containing material in powders.

In some embodiments, preparing the carbon precursor-containing material from the industrial hemp material includes: subjecting the industrial hemp material to a pulping process to obtain the carbon precursor-containing material in a form of a pulp or a dispersion liquid.

In some embodiments, the method further includes: adding a carbon-based material to the carbon precursor-containing material, and the carbon-based material includes, but is not limited to, coke, charcoal and graphite.

In some embodiments, the carbonization may be selectively performed at a low oxygen condition, a protective atmosphere condition or a vacuum condition.

The carbon precursor-containing material may be carbonized to different degrees by controlling parameter like temperature and time.

In some embodiments, the carbonization of the carbon precursor-containing material may be surface carbonization, partial carbonization or complete carbonization of the carbon precursor-containing material.

In some embodiments, the method further includes: optionally pretreating the industrial hemp material with a flame retardant before the carbonization.

In some embodiments, the carbonization is performed by resistance furnace heating, infrared heating, laser irradiation heating, microwave radiation heating, or any combination thereof.

In some embodiments, the carbonization is performed by microwave radiation heating.

In some embodiments, the microwave radiation heating has an energy density greater than an energy density threshold of the carbonization of the carbon precursor-containing material.

In some embodiments, before the laser scanning, the method further includes: optionally adding a catalyst to the carbonized carbon precursor-containing material, to promote the conversion of the internal material into graphene and accelerate the production of laser-induced graphene.

In some embodiments, the catalyst is at least one selected from carbon quantum dots, graphite quantum dots, graphene quantum dots, graphene oxide quantum dots or any combination thereof.

In some embodiments, a laser used in the laser scanning is an ultraviolet having a wavelength ranging from 200 to 400 nm, a visible light having a wavelength ranging from 400 to 760 nm or an infrared having a wavelength ranging from 760 to 14000 nm.

In some embodiments, the laser used in the laser scanning is the visible light having a wavelength ranging from 400 to 760 nm or the infrared having a wavelength ranging from 760 to 10600 nm.

In some embodiments, the laser used in the laser scanning having a wavelength of 450 nm, 515 nm, 800 nm, 1030 nm or 10600 nm.

In some embodiments, the laser used in the laser scanning is a continuous laser or a pulse laser.

In some embodiments, the laser used in the laser scanning is a pulse laser.

In some embodiments, the laser used in the laser scanning is a millisecond or microsecond pulse laser. Local high temperature generated by the thermal shock of the pulse laser in milliseconds or microseconds breaks the chemical bonds in the carbon precursor-containing material.

In some embodiments, the laser scanning may be single scanning with a small light spot at a focus position, multiple scannings with a small light spot at a focus position, or single scanning with a large light spot at a defocus position.

In some embodiments, the laser scanning is the single scanning with a large light spot at the defocus position.

In some embodiments, the graphene material is a porous graphene coated fiber material, graphene, graphene quantum dots, a graphene mesoporous material or a graphene composite material.

In some embodiments, the industrial hemp material is the skin of industrial hemp, the industrial hemp material is processed into flakes, and the graphene material is a porous graphene coated fiber material.

In some embodiments, the industrial hemp material is the skin of industrial hemp, the industrial hemp material is processed into powders, and the graphene material is graphene, graphene quantum dots or a graphene mesoporous material.

In some embodiments, the industrial hemp material is the skin of industrial hemp, the industrial hemp material is processed into a pulp or a dispersion liquid, and the graphene material is a graphene composite material.

In some embodiments, the industrial hemp material is the core of the stem of industrial hemp, the industrial hemp material is processed into flakes, and the graphene material is graphene or a graphene mesoporous material.

In some embodiments, the industrial hemp material is the core of the stem of industrial hemp, the industrial hemp material is processed into powders, and the graphene material is graphene, graphene quantum dots or a graphene mesoporous material.

In some embodiments, the industrial hemp material is the core of the stem of industrial hemp, the industrial hemp material is processed into a pulp or a dispersion liquid, and the graphene material is a graphene composite material.

In some embodiments, the industrial hemp material is the root of industrial hemp, the industrial hemp material is processed into flakes, and the graphene material is graphene or a graphene mesoporous material.

In some embodiments, the industrial hemp material is the root of industrial hemp, the industrial hemp material is processed into powders, and the graphene material is graphene, graphene quantum dots or a graphene mesoporous material.

In some embodiments, the industrial hemp material is the root of industrial hemp, the industrial hemp material is processed into a pulp or a dispersion liquid, and the graphene material is a graphene composite material.

The method according to embodiments of the present disclosure reduces the carbon precursor-containing material in the industrial hemp into graphene by laser induction, so as to realize the preparation of various graphene materials, including graphene, graphene quantum dots, the graphene mesoporous material and graphene composite material. Particularly, the method according to embodiments of the present disclosure uses the skin of industrial hemp as the raw material, and converts the colloid part of the skin of the industrial hemp into graphene, but retains the fiber tissue of the skin of the industrial hemp, so as to obtain the porous graphene coated fiber material. The method according to embodiments of the present disclosure makes full use of the natural coating of the colloid part of the hemp skin on the fiber tissue, and takes the colloid as the carbon precursor-containing material to be reduced into graphene, so as to realize the coating of the graphene on the fiber tissue. The method according to embodiments of the present disclosure combines the laser-induced graphene generation with the natural coating of the colloid part of the hemp skin on the fiber tissue to prepare a porous graphene coated fiber material, which does not need an additionally coating process. Therefore, the raw material used by the method according to embodiments of the present disclosure is green and environment-friendly, and the method of the present disclosure is simple, efficient and economic, and is suitable for the preparation and mass production of various graphene related materials. The porous graphene coated fiber material obtained by the method of the present disclosure has good coating uniformity and good performances.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the drawings, in which:

FIG. 1 is a schematic flowchart of a method for preparing a graphene material from industrial hemp material by laser induction according to an embodiment of the present disclosure.

DETAILED DESCRIPTION

Figure 2:
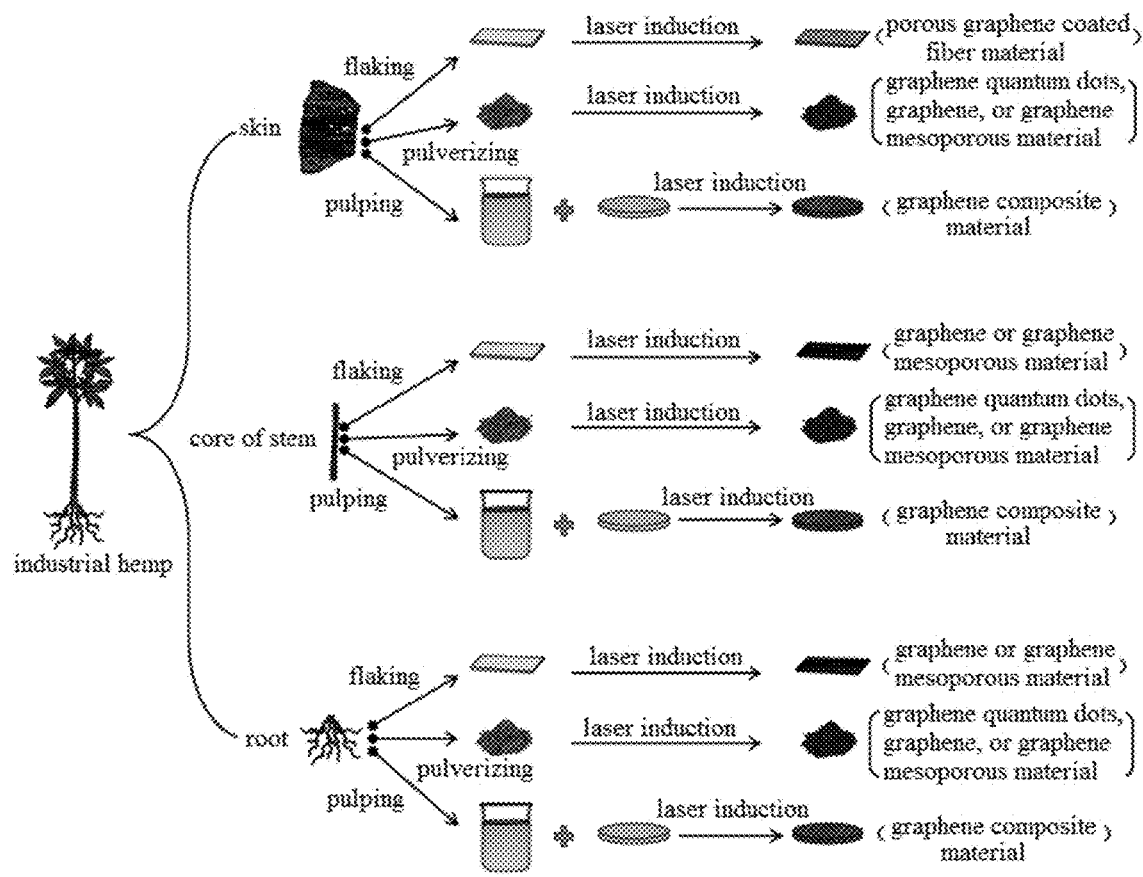
FIG. 2 is a schematic diagram showing preparation of various types of graphene materials from industrial hemp by laser induction according to some embodiments of the present disclosure.

Embodiments of the present disclosure provide a method for preparing a graphene material from industrial hemp by laser induction, which uses the industrial hemp as a carbon precursor-containing material, and adopts laser scanning to induce the generation of the graphene, so as to obtain various graphene related materials, including graphene, graphene quantum dots, a graphene mesoporous material and a graphene composite material. In particular, the method according to embodiments of the present disclosure uses the skin of the industrial hemp as the carbon precursor-containing material, and adopts the laser induction to convert the colloid part of the skin of the industrial hemp into graphene, so as to realize the coating of graphene on the fiber tissue of the skin of the industrial hemp and obtain a porous graphene coated fiber material.

In the following, the present disclosure will be described in detail with reference to the drawings and examples below.

FIG. 1 is a schematic flowchart of a method for preparing a graphene material from industrial hemp by laser induction according to an embodiment of the present disclosure.

Firstly, the naturally air-dried industrial hemp is subjected to peeling and cutting treatments to obtain a skin, a stem and a root of the industrial hemp, each of which can be used as the carbon precursor-containing material.

Subsequently, depending on the requirements of different materials and preparation processes, one or more of the skin, the stem and the root of the industrial hemp may be subjected to a flaking process, a pulverizing process or a pulping process to obtain the carbon precursor-containing material in different states.

Then, the obtained carbon precursor-containing material is subjected to vacuum carbonization by heating under a vacuum condition. The heating includes, but is not limited to, resistance furnace heating, infrared heating and microwave radiation heating. The vacuum carbonization may be selectively performed in the preparation of the graphene material. According to production requirements of the desired materials, surface carbonization, partial carbonization or complete carbonization of the carbon precursor-containing material may be performed by controlling parameters like carbonization temperature and time, so as to realize the selective carbonization of the carbon precursor-containing material. For example, in the preparation of a porous graphene coated fiber material, the partial carbonization is required, so as to carbonize the colloid part, but not carbonize the fiber tissue.

Then, the carbon precursor-containing material is subjected to laser induction by laser scanning to reduce the carbon precursor-containing material into graphene. In the laser scanning process, parameters such as laser energy, scanning speed and spot size are controlled, so that the generation of laser-induced graphene has higher efficiency. In embodiments of the present disclosure, the scanning speed may be controlled in m/s level.

Finally, depending on different states of the carbon precursor-containing material, graphene, graphene quantum dots, graphene mesoporous materials or graphene composite materials are obtained.

FIG. 2 is a schematic diagram showing preparation of various types of graphene materials from industrial hemp by laser induction according to some embodiments of the present disclosure. As can be seen from FIG. 2, the method according to embodiments of the present disclosure is able to prepare various types of graphene materials. Specifically, for industrial hemp materials from different tissue parts of the industrial hemp and in different states, different graphene materials may be obtained by laser induction. Specifically, the skin, the stem and the root of the industrial hemp each may be subjected to a flaking process, a pulverizing process or a pulping process to obtain the carbon precursor-containing material in flakes, in powders or in a form of a pulp or a dispersion liquid, respectively. For example, the skin of the industrial hemp may be processed into flakes and used to prepare a porous graphene coated fiber material. Alternatively, the skin of the industrial hemp may be processed into powders and used to prepare graphene, graphene quantum dots or a graphene mesoporous material. Alternatively, the skin of the industrial hemp may be processed into a pulp or a dispersion liquid, and mixed and pulverized with other materials or coated on the surface of other materials to prepare different types of graphene composite materials. The core of the stem of the industrial hemp may be processed into flakes and used to prepare graphene or a graphene mesoporous material. Alternatively, the core of the stem of the industrial hemp may be processed into powders and used to prepare graphene, graphene quantum dots or a graphene mesoporous material. Alternatively, the core of the stem of the industrial hemp may be processed into a pulp or a dispersion liquid, and mixed and pulverized with other materials or coated on the surface of other materials to prepare different types of graphene composite materials. The root of the industrial hemp may be processed into flakes and used to prepare graphene or a graphene mesoporous material. Alternatively, the root of the industrial hemp may be processed into powders and used to prepare graphene, graphene quantum dots or a graphene mesoporous material. Alternatively, the root of the industrial hemp may be processed into a pulp or a dispersion liquid, and mixed and pulverized with other materials or coated on the surface of other materials to prepare different types of graphene composite materials.

Figure 3:
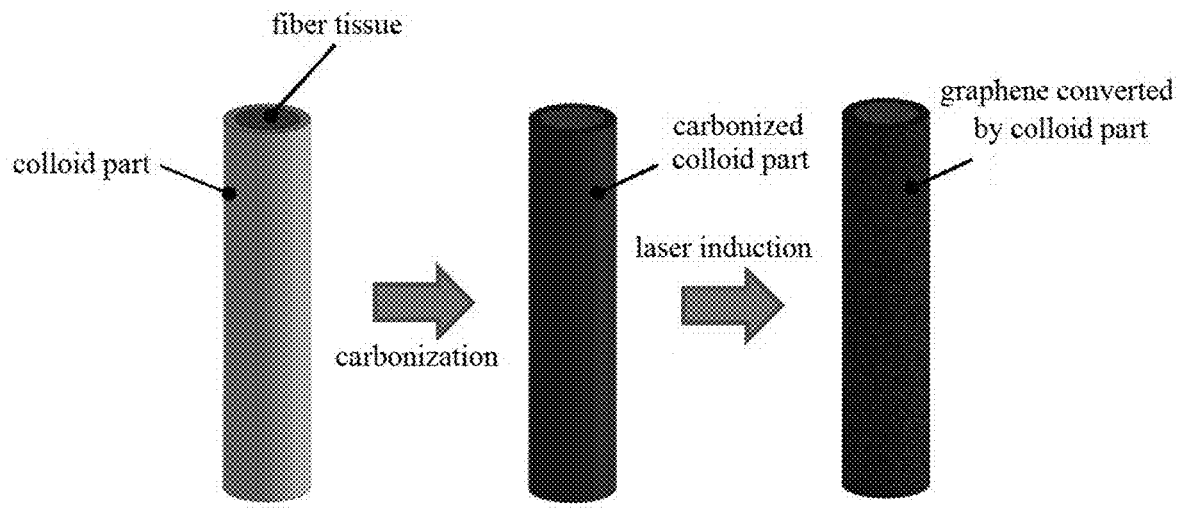
FIG. 3 is a schematic diagram showing conversion and structure of a porous graphene coated fiber material according to an embodiment of the present disclosure.

FIG. 3 is a schematic diagram showing conversion and structure of a porous graphene coated hemp fiber material according to an embodiment of the present disclosure.

Figure 4:
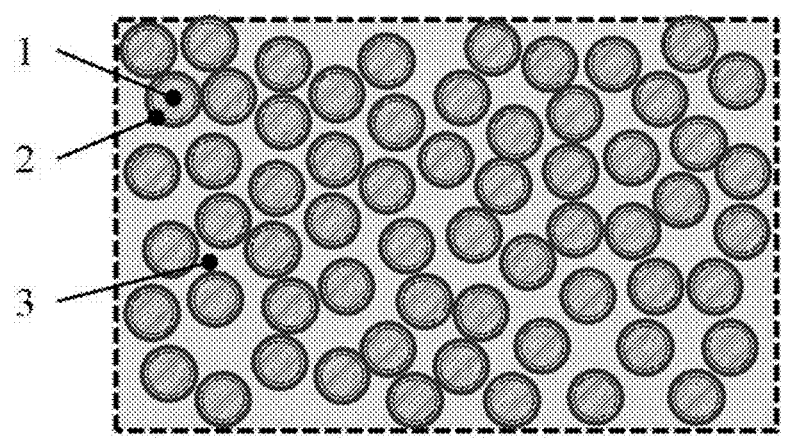
FIG. 4 is a schematic partial cross-sectional view of a porous graphene coated fiber material, including hemp fibers 1, graphene 2 and a porous structure 3, according to an embodiment of the present disclosure.

The fiber tissue in hemp fiber is naturally coated by the colloid part. The carbon precursor in the colloid part coated on the surface of the fiber tissue is carbonized, and then is reduced into graphene by laser induction, so as to realize the coating of the graphene on the hemp fiber. The specific process is shown in FIG. 2. Due to the structural characteristics of the hemp fiber itself and the decomposition and transformation of the colloidal part in the preparation process, the obtained graphene coated hemp fiber material has a porous structure. As shown in FIG. 4, a single hemp fiber is coated by graphene, and pores can be clearly observed among hemp fibers, that is, the obtained material has a porous structure.

EXAMPLE 1

There is provided a method for preparing a graphene material from industrial hemp by laser induction.

In this example, a $CO_2$ laser equipment with a wavelength of 10.6 μm was used to induce the reduction of the skin of the industrial hemp to prepare a porous graphene coated fiber material in flakes.

Specifically, the method includes the following steps.
(1) The naturally air-dried industrial hemp was peeled to obtain hemp skin, which was cut, flaked and processed to obtain square flakes in a size of 20 mm×20 mm.
(2) The obtained hemp skin in flakes was placed in microwave vacuum heating equipment for vacuum carbonization. By controlling parameters like heating temperature and time of the microwave vacuum heating equipment, the colloid part of the hemp skin was carbonized, and at the same time, the fiber tissue of the hemp skin was not carbonized.
(3) A small amount of graphene quantum dots was added into the vacuum carbonized hemp skin as a catalyst.
(4) The hemp skin was placed flatly on a processing platform of the $CO_2$ laser equipment and was scanned continuously on one surface thereof by a $CO_2$ laser with a wavelength of 10.6 μm at a focus position.
(5) The hemp skin was reversed and scanned on a reverse surface to obtain a porous graphene coated fiber material.

EXAMPLE 2

There is provided a method for preparing a graphene material from industrial hemp by laser induction.

In this example, a femtosecond pulse laser equipment with a wavelength of 1030 nm was used to induce the reduction of the stem of the industrial hemp to prepare a graphene material in powders.

Specifically, the method includes the following steps.
(1) The naturally air-dried stem of the industrial hemp was peeled to remove the hemp skin to obtain the core of the stem, which was cut, crushed and grinded into powders with an average particle size of 5-10 μm.
(2) The obtained powders were evenly paved and completely carbonized by infrared heating.
(3) The carbonized powders were evenly paved on a processing platform of the femtosecond pulse laser equipment and were reduced by continuous scanning with a 1030 nm femtosecond pulse laser to obtain a graphene powdered material.

EXAMPLE 3

There is provided a method for preparing a graphene material from industrial hemp by laser induction.

In this example, a microsecond pulse laser equipment with a wavelength of 515 nm was used to induce the reduction of a glass fiber filter paper coated by an industrial hemp material to prepare a graphene coated glass fiber filter paper.

Specifically, the method includes the following steps.
(1) The naturally air-dried root of the industrial hemp was cut, crushed and grinded into powders with an average particle size of 1-3 μm.
(2) The obtained powders were mixed with deionized water and a dispersant, and subjected to magnetic stirring and ultrasonic dispersion treatment to obtain a dispersion liquid of the carbon precursor-containing material with a concentration of 5 mg/ml.
(3) A superfine glass fiber cotton was fully immersed in the dispersion liquid of the carbon precursor-containing material, and was dispersed by a fiber dissociator to obtain a turbid liquid of the carbon precursor-containing material and the glass fiber pulp.
(4) The turbid liquid was made into papers by a paper forming machine through a wet process, and the paper was soaked in an acrylic adhesive system with a mass fraction of 10-15%, and then dried on a drying plate at 80 to 100° C. to obtain a glass fiber filter paper with the carbon precursor-containing material.
(5) The glass fiber filter paper was cut into a size of 100 mm×100 mm, and then placed flatly on a processing platform of microsecond pulse laser equipment, and scanned continuously on one surface thereof with a 515 nm microsecond pulse laser.
(6) The glass fiber filter paper was reversed and scanned on a reverse surface to obtain the graphene coated glass fiber filter paper.

In the present disclosure, a variety of graphene materials, including graphene, graphene quantum dots, graphene mesoporous materials and graphene composite materials, can be prepared from the skin, stem and root of industrial hemp as carbon precursor-containing materials by laser induction. In particular, as the fiber tissue in the skin of the industrial hemp is naturally coated by the colloid part of the hemp skin, by converting the colloid part into graphene through laser induction, a porous graphene coated fiber material can be obtained. The method of the present disclosure is environmentally friendly, high efficient, and economic, and is suitable for mass production of graphene related materials. The method according to the present disclosure is simple and efficient, and the prepared material has good coating uniformity and good performances.

The combination of the graphene and the fiber gives the obtained material the functions of electrical conductivity, antibacterial, radiation protection, and ultraviolet protection. The obtained porous graphene coated fiber material can be used as functional composites in fields such as textiles and functional clothing, and has high military and civil value.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:
1. A method for producing a graphene material from an industrial hemp material by laser induction, comprising:
preparing a carbon precursor-containing material from the industrial hemp material;
subjecting the carbon precursor-containing material to carbonization; and
subjecting the carbonized carbon precursor-containing material to laser scanning to convert the carbonized carbon precursor-containing material into the graphene material, wherein before the laser scanning, the method further comprises:
adding a catalyst to the carbonized carbon precursor-containing material,
wherein the catalyst is at least one selected from carbon quantum dots, graphite quantum dots, graphene quantum dots, graphene oxide quantum dots or any combination thereof.

2. The method according to claim 1, wherein the industrial hemp material comprises at least one selected from a skin, a stem and a root of industrial hemp.

3. The method according to claim 1, further comprising:
adding a carbon-based material to the carbon precursor-containing material,
wherein the carbon-based material comprises at least one selected from coke, charcoal and graphite.

4. The method according to claim 1, wherein the carbonization is performed at a low oxygen condition, a protective atmosphere condition or a vacuum condition with controlled temperature and time to carry out surface carbonization, partial carbonization or complete carbonization of the carbon precursor-containing material.

5. The method according to claim 1, further comprising:
pretreating the industrial hemp material with a flame retardant before the carbonization.

6. The method according to claim 1, wherein a laser used in the laser scanning is an ultraviolet having a wavelength ranging from 200 to 400 nm, a visible light having a wavelength ranging from 400 to 760 nm or an infrared having a wavelength ranging from 760 to 14000 nm.

7. The method according to claim 1, wherein a laser used in the laser scanning is a continuous laser, a pulse laser, or a combination thereof.

8. The method according to claim 1, wherein the laser scanning is single scanning with a small light spot at a focus position, multiple scannings with a small light spot at a focus position, or single scanning with a large light spot at a defocus position.

9. The method according to claim 1, wherein the graphene material is a porous graphene coated fiber material, graphene, graphene quantum dots, a graphene mesoporous material or a graphene composite material.

10. The method according to claim 1, wherein the carbonization is performed by resistance furnace heating, infrared heating, laser irradiation heating, microwave radiation heating, or any combination thereof.

11. The method according to claim 10, wherein the microwave radiation heating has an energy density greater than an energy density threshold of the carbonization of the carbon precursor-containing material.

12. The method according to claim 1, wherein preparing the carbon precursor-containing material from the industrial hemp material comprises:
subjecting the industrial hemp material to a flaking process to obtain the carbon precursor-containing material in flakes; or
subjecting the industrial hemp material to a pulverizing process to obtain the carbon precursor-containing material in powders; or
subjecting the industrial hemp material to a pulping process to obtain the carbon precursor-containing material in a form of a pulp or a dispersion liquid.

13. The method according to claim 12, wherein the industrial hemp material is a skin of industrial hemp;
wherein the industrial hemp material is processed into flakes, and the graphene material is a porous graphene coated fiber material; or
the industrial hemp material is processed into powders, and the graphene material is graphene, graphene quantum dots or a graphene mesoporous material; or
the industrial hemp material is processed into a pulp or a dispersion liquid, and the graphene material is a graphene composite material.

14. The method according to claim 12, wherein the industrial hemp material is a core of a stem of industrial hemp;
wherein the industrial hemp material is processed into flakes, and the graphene material is graphene or a graphene mesoporous material; or
the industrial hemp material is processed into powders, and the graphene material is graphene, graphene quantum dots or a graphene mesoporous material; or
the industrial hemp material is processed into a pulp or a dispersion liquid, and the graphene material is a graphene composite material.

15. The method according to claim 12, wherein the industrial hemp material is a root of industrial hemp;
wherein the industrial hemp material is processed into flakes, and the graphene material is graphene or a graphene mesoporous material; or
the industrial hemp material is processed into powders, and the graphene material is graphene, graphene quantum dots or a graphene mesoporous material; or
the industrial hemp material is processed into a pulp or a dispersion liquid, and the graphene material is a graphene composite material.

16. A method for producing a graphene material from an industrial hemp material by laser induction, comprising:
preparing a carbon precursor-containing material from the industrial hemp material;
subjecting the carbon precursor-containing material to carbonization; and
subjecting the carbonized carbon precursor-containing material to laser scanning to convert the carbonized carbon precursor-containing material into the graphene material,
wherein the method further comprises:
pretreating the industrial hemp material with a flame retardant before the carbonization.

17. The method according to claim 16, wherein the carbonization is performed at a low oxygen condition, a protective atmosphere condition or a vacuum condition with controlled temperature and time to carry out surface carbonization, partial carbonization or complete carbonization of the carbon precursor-containing material.

18. The method according to claim 16, wherein the industrial hemp material is a skin of industrial hemp;
wherein the industrial hemp material is processed into flakes, and the graphene material is a porous graphene coated fiber material; or
the industrial hemp material is processed into powders, and the graphene material is graphene, graphene quantum dots or a graphene mesoporous material; or
the industrial hemp material is processed into a pulp or a dispersion liquid, and the graphene material is a graphene composite material.

19. The method according to claim 16, wherein the industrial hemp material is a core of a stem of industrial hemp;
wherein the industrial hemp material is processed into flakes, and the graphene material is graphene or a graphene mesoporous material; or the industrial hemp material is processed into powders, and the graphene material is graphene, graphene quantum dots or a graphene mesoporous material; or the industrial hemp material is processed into a pulp or a dispersion liquid, and the graphene material is a graphene composite material.

20. The method according to claim 16, wherein the industrial hemp material is a root of industrial hemp;

wherein the industrial hemp material is processed into flakes, and the graphene material is graphene or a graphene mesoporous material; or the industrial hemp material is processed into powders, and the graphene material is graphene, graphene quantum dots or a graphene mesoporous material; or the industrial hemp material is processed into a pulp or a dispersion liquid, and the graphene material is a graphene composite material.

\* \* \* \* \*